United States Patent [19]

Stowell et al.

[11] 4,218,413

[45] Aug. 19, 1980

[54] HIGH PORE VOLUME ALUMINA POWDERS

[75] Inventors: Donald E. Stowell, Oklahoma City, Okla.; John F. Scamehorn, Austin, Tex.; Larry L. Bendig, Ponca City, Okla.

[73] Assignee: Conoco, Inc., Ponca City, Okla.

[21] Appl. No.: 970,282

[22] Filed: Dec. 18, 1978

[51] Int. Cl.$^2$ ............................................. B01J 2/02
[52] U.S. Cl. ........................................ 264/13; 264/42
[58] Field of Search ................................... 264/13, 42

[56] References Cited

U.S. PATENT DOCUMENTS 3,406,228  10/1968  Hardy .................................. 264/13

*Primary Examiner*—Donald J. Arnold
*Assistant Examiner*—James R. Hall
*Attorney, Agent, or Firm*—Cortlan R. Schupbach, Jr.

[57] ABSTRACT

A method for increasing the pore volume of alumina powder produced by spray drying alumina slurries by heating the slurry to a temperature near the boiling point of water and a pressure up to the critical point of water then introducing the slurry to a spray drying chamber through a small orifice, thereby creating a backpressure in excess of slurry vapor pressure and up to the critical point of water.

1 Claim, No Drawings

HIGH PORE VOLUME ALUMINA POWDERS

This invention relates to a method for producing high pore volume alumina powders. More particularly, this invention relates to a method for producing high pore volume alumina powders by heating alumina slurry to a minimum temperature prior to drying.

Numerous processes have been heretofore used in the production of alumina. Alumina has been produced by the water hydrolysis of aluminum alkoxides, the alum process, the sodium aluminate process, and numerous variations thereof. Alumina has a variety of uses such as for catalysts, catalyst supports and the like. In many of these applications, the usefulness of the alumina is directly related to its pore volume. Generally, alumina having high porosity is more desirable for most processes. However, from whatever form an alumina slurry is obtained, it is necessary to dry the alumina prior to use.

U.S. Pat. No. 3,845,801 shows the drying of an aqueous suspension slurry or paste of particulate matter by passing such product across an orifice plate at a pressure drop through the orifice plate of from 300 pounds per square inch gauge (psig) to 700 psig. Other references show introducing hot gases near the treated material to obtain hollow pellets such as shown in U.S. Pat. No. 3,347,798. Spray drying is shown in U.S. Pat. No. 3,352,636 and injection drying using entry air at 210° F. is shown in U.S. Pat. No. 3,411,878. However, none of these methods can produce the high pore volume often desired. Alumina powders are commercially prepared by spray drying the corresponding slurries as described in the above-identified patents, where high speed rotating wheels or spray nozzles are used as a means of introducing the slurry into the drying chamber. These references show that when the slurry is charged into the dryer it is charged directly from the production process at a pressure adequate to drive the slurry through the nozzle at the required rate.

The instant invention provides a method for obtaining high pore volume alumina powders by first heating the alumina slurry to a high temperature and pumping the slurry through a small diameter nozzle at high pressure into the drying chamber. The process has the advantages of producing an alumina powder having a high pore volume while concurrently recognizing significant energy savings in the dryer operation. As the temperature of incoming slurry is increased for a given drier pressure (as the difference between slurry vapor pressure and drier chamber pressure increases) the alumina pore volume increases.

It is preferred that the alumina used in the practice of the instant invention be that derived from the hydrolysis of aluminum alkoxides, although alumina from other sources can be profitably employed in the instant invention.

Aluminum alkoxides suitable for use in the method of the instant invention are those aluminum alkoxides wherein the alkoxy groups contain from 2 to 30 carbon atoms each. Suitable aluminum alkoxides are produced by processes such as the Ziegler process. The preparation of such aluminum alkoxides is well known to those skilled in this art. For example, in many instances, the aluminum alkoxides are produced for the purpose of producing alumina or alcohols. In any event, it is desirable that the alcohols be recovered as such since they constitute a valuable co-product of the reaction. Some suitable alkoxide mixtures are those produced by the Ziegler process and may contain minor amounts of alkoxy groups containing less than four carbon atoms. Alcohols produced by the Ziegler process will contain only alkoxy groups having an even number of carbon atoms.

Such aluminum alkoxides are then contacted with an excess of water to form alumina and alcohols containing 2 to 30 carbon atoms. The alumina is a solid largely immiscible in water and precipitates, thereby facilitating recovery. The alcohols can readily be separated by decanting and the like. If desired organic diluents can be used in order to more readily separate the recovered alcohols from the precipitated alumina.

The alumina is then normally steam stripped to remove any alcohol impurities. At this point, the alumina is usually dried using one of the methods of the prior art and reduced to a convenient size before forming into the desired shape. However, in the process of the instant invention, the alumina will be first heated to a high temperature and then introduced into the drying chamber through an orifice sufficiently small to exert a high resulting pressure in excess of the slurry vapor pressure, and up to the critical point of water. The slurry then enters the drying chamber at a temperature that has a corresponding vapor pressure greatly in excess of the drying chamber pressure (more in excess than normal spray drying).

The instant invention is important since the production of high pore volume powders usually involves drying the slurry from an alcohol which is expensive requiring steam stripping, reslurrying, and redrying. The second improvement is important since the spray drying operation generally constitutes a substantial portion of the cost in generating alumina. Such costs would be greatly reduced by the process of the instant invention.

Concisely summarized then, the process of the instant invention comprises a method for the production of alumina powder having high pore volume, comprising drying an alumina slurry by (1) heating said slurry to a temperature above 190° F., and
(2) a pressure of up to the critical point of water, then
(3) introducing said slurry to a drying chamber through an orifice sufficiently small to create a resulting pressure in excess of slurry vapor pressure. Preferably this resulting pressure should be equal to or greater than 50 pounds per square inch gauge (psig).

An explanation of the critical point of water can be found in *Introduction To Chemical Engineering Thermodynamics*, Smith and Van Ness 2nd Edition, Page 87, McGraw Hill Publishing Co., (1959). Concisely, the critical point of water is the highest temperature and pressure at which liquid and vapor phases exist in equilibrium.

The slurry temperature when injected into the drier must be sufficiently high to ensure a large vapor pressure differential between the drier chamber pressure and the slurry vapor pressure for the water to be removed at an accelerated rate. Normally this temperature will range from 220° F. up to the critical point of water. If the pressure in the drier is reduced below ambient, then the temperature of the slurry can be correspondingly reduced. In a case of reduced drier pressure, the temperature will usually be maintained at least at 190° F.

The invention is more concretely described with reference to the examples below wherein all parts and percentages are by weight unless otherwise specified. The examples are provided to illustrate the instant invention and not to limit it.

In each of the examples, a sample of alumina slurry obtained from the hydrolysis of alumina alkoxides and containing about 6 to 15% $Al_2O_3$ by weight. Alcohols are removed and the slurry is then dried.

In Test 1 illustrated in Table 1 below, the alumina slurry was at a temperature of 150° F. and dried using an atomizing wheel having very little resulting pressure. In Test 2 the alumina was at 335° F. under a resulting pressure of 750 psig introduced into the dryer through a high temperature spray nozzle. In Test 3 the alumina was compared to a method where the slurry was inserted into the dryer at a pressure of 800 psig but at a temperature of only 100° F., thus showing the effect of preheating the alumina slurry. Example 1 is a good representation of the prior art.

Example 4 shows a second high temperature spray nozzle under slightly different temperature and pressure conditions. It is apparent that the total pore volume has increased substantially relative to the base case atomizer wheel experiments and the base case injection experiments at low temperature.

Example 5 was a batch experiment directed at defining the near ultimate potential of high temperature spraying described in the instant invention. In this experiment, filtercake was charged to a high pressure bomb and heated to about 650° F., at which temperature the pressure was suddenly released. The product pore volume represents the material which remained in the bomb. It is apparent that very large porosity gains are potentially available if the spray dryer slurry feed could be heated to a temperature about the critical point of water (705° F.) and then sprayed or flashed across an orifice or nozzle. The bomb system was used since the equipment available could not be modified to the point where the higher pressures and temperatures could be adequately studied.

TABLE 1

HIGH TEMPERATURE SPRAY NOZZLE EXPERIMENTS

| Experiment | SLURRY CONDITIONS PRIOR TO ENTERING DRIER | | Notes | Resultant Powder Pore Volume cc/gm |
|---|---|---|---|---|
| | Temp. °F. | Pressure, psig | | |
| 1 | 150 | 0 | Base Case Run With Atomizer Wheel | .47 |
| 2 | 335 | 750 | High Temperature Spray Nozzle | .575 |
| 3 | 100 | 800 | High Pressure, Base Temperature | .490 |
| 4 | 317 | 625 | High Temperature Spray Nozzle | .570 |
| 5 | 650 | 2400 | Batch Experiment | .945 |

The pore volume was determined using the mercury penetration techniques at pressures of up to 50,000 psig using a mercury porosimeter Model 905-1 manufactured by Micromeritics Corporation of Norcross, Georgia. The pore volume of alumina generated by the experiments carried out clearly shows the advantage of the instant invention when compared to the prior art.

While certain embodiments and details have been shown for the purpose of illustrating this invention, it will be apparent to those skilled in this art that various changes and modifications may be made herein without departing from the spirit or scope of the invention.

We claim:

1. A method for forming alumina powder having particles of increased pore volume over prior methods, comprising:
   (a) heating a water slurry of alumina to a temperature of no less than 190° F.,
   (b) subjecting said slurry to a pressure of at least 50 psig, and exceeding the vapor pressure of said heated slurry,
   (c) passing said slurry through a relatively small orifice into a spray drying chamber wherein the vapor pressure of said slurry entering said drying chamber greatly exceeds the existing pressure within said drying chamber, and wherein droplets, formed by passing said slurry through said orifice, are dried in said chamber to form a powder having increased pore volume.

* * * * *